(12) United States Patent
Weir

(10) Patent No.: US 11,690,421 B1
(45) Date of Patent: Jul. 4, 2023

(54) SEA FACE

(71) Applicant: Royal Caribbean Cruises Ltd., Miami, FL (US)

(72) Inventor: Nick Weir, Miami, FL (US)

(73) Assignee: Royal Caribbean Cruises, Ltd., Miami, FL (US)

( * ) Notice: Subject to any disclaimer, the term of this patent is extended or adjusted under 35 U.S.C. 154(b) by 91 days.

(21) Appl. No.: 17/214,894

(22) Filed: Mar. 28, 2021

(51) Int. Cl.
| | |
|---|---|
| *A41H 3/08* | (2006.01) |
| *G06F 16/583* | (2019.01) |
| *B41M 5/00* | (2006.01) |
| *A41D 13/11* | (2006.01) |
| *G06V 40/16* | (2022.01) |
| *G06K 15/02* | (2006.01) |
| *G06K 15/00* | (2006.01) |

(52) U.S. Cl.
CPC ............ *A41H 3/08* (2013.01); *B41M 5/0041* (2013.01); *G06F 16/5854* (2019.01); *G06K 15/005* (2013.01); *G06K 15/021* (2013.01); *A41D 13/11* (2013.01); *G06V 40/172* (2022.01)

(58) Field of Classification Search
CPC .... A41H 3/08; B41M 5/0041; G06F 16/5854; G06K 15/005; G06K 15/021; G07C 9/37; G07C 9/38; A41D 13/11; G06V 40/172
See application file for complete search history.

(56) References Cited

U.S. PATENT DOCUMENTS 11,406,143 B2 * 8/2022 Danforth ................ A41D 13/11

FOREIGN PATENT DOCUMENTS

WO  WO-2015195303 A1 * 12/2015 ........... A62B 23/025

* cited by examiner

*Primary Examiner* — Daniell L Negron
(74) *Attorney, Agent, or Firm* — CRGO Global; Steven M. Greenberg

(57) ABSTRACT

Embodiments of the present invention provide a method, system and computer program product for dynamically personalizing a respiratory mask. A method for the dynamic personalization of a respiratory mask includes electronically scanning an identification of a guest on an oceangoing vessel, querying a data store of images of guest faces for an image of a face matching the identification of the guest, retrieving the matching image of the face into memory of the computing system, loading a printer with a respiratory mask such as an N95 mask or a KN95 mask, printing onto the mask a portion of the matching image of the face corresponding to a portion of the face obscured by the mask when the mask is worn by the guest and ejecting the mask with the printing from the printer.

18 Claims, 2 Drawing Sheets

SEA FACE

BACKGROUND OF THE INVENTION

Field of the Invention

The present invention relates to the field of personal protective equipment (PPE) and more particularly to a face mask.

Description of the Related Art

Personal protective equipment, commonly referred to as "PPE", is equipment worn to minimize exposure to hazards that cause serious injuries and illnesses. These injuries and illnesses may result from contact with biological, chemical, radiological, physical, electrical, mechanical, or other hazards. Personal protective equipment may include items such as gloves, safety glasses and shoes, earplugs or muffs, hard hats, respirators, masks, coveralls, vests and full body suits. As it relates to the transmission of communicable diseases, the mask has proven to be essential in the protection of wearers from both transmitting a communicable virus to others, and also from becoming infected through the airborne transmission of a virus.

Masks come in many different forms including both N95 and KN95 masks which represent different governmental certifications for the effectiveness of a mask in capturing particles of different sizes. Masks can be cloth or respiratory quality the latter being formed from synthetic plastic fibers such as polypropylene. While cloth masks are considered to be more "fashionable" owing to different color fabrics and printable patterns available as a decorative feature as compared to the colorless, plain appearance of a respiratory mask, cloth masks can be expensive and, of course, provide less protection than a respiratory grade mask. In both cases, however, the mask obscures the wearer's face so that it can be difficult to identify the wearer of the mask, even at close range.

In ordinary circumstances, the obscuring of a face is of little consequence, but in certain circumstances, "seeing" the full face of a person is very important. In this regard, in the context of group travel and especially when cruising at sea on a cruise ship, recognizing one by their full face is critical to the cruising experience. As it is well-understood, lifelong friendships are forged in the course of a cruise as strangers remain captive for long periods of time on a ship at sea. Being unable to "see" the full face of a fellow passenger for the duration of the cruise owing to mask wearing requirements of safety from the transmission of a virus will inhibit the forging of these lifelong friendships.

BRIEF SUMMARY OF THE INVENTION

Embodiments of the present invention address deficiencies of the art in respect to mask wearing during group travel and provide a novel and non-obvious method, system and computer program product for dynamically personalizing a respiratory mask. In an embodiment of the invention, a method for the dynamic personalization of a respiratory mask includes electronically scanning an identification of a guest on an oceangoing vessel, querying a data store of images of guest faces for an image of a face matching the identification of the guest, retrieving the matching image of the face into memory of the computing system, loading a printer with a respiratory mask such as an N95 mask or a KN95 mask, printing onto the mask a portion of the matching image of the face corresponding to a portion of the face obscured by the mask when the mask is worn by the guest and ejecting the mask with the printing from the printer.

In one aspect of the embodiment, an image may be acquired of a face of the guest wearing the mask with the printing at a portal to the oceangoing vessel, the acquired image of the face may be equated with the matched image from the data store and a display generated at the portal clearing the guest to pass through the portal. In another aspect of the embodiment, the method additionally includes displaying in a display at the computing system, the portion of the matching image of the face corresponding to the portion of the face obscured by the mask when the mask is worn by the guest, presenting a palette in the display of different drawing tools, selecting through the display at least one of the drawing tools, applying at least one decorative annotation to the portion of the matching image of the face in the display with the selected at least one of the drawing tools and performing the printing onto the mask with the annotated portion of the matching image of the face. In even yet another aspect of the embodiment, the method additionally includes registering the annotated portion of the matching image of the face in the data store of images as an acceptable alternative image for matching with the acquired image during the equating.

In another embodiment of the invention, a data processing system can be adapted for dynamic personalization of a respiratory mask. The system includes a host computing platform with one or more computers, each having memory and at least one processor, a display and a coupled printer. The system also includes a mask printing module. The module includes computer program instructions enabled while executing in the host computing platform to electronically scan an identification of a guest, query a data store of images of guest faces for an image of a face matching the identification of the guest, retrieve the matching image of the face into the memory, load the printer with a respiratory mask, print onto the mask a portion of the matching image of the face corresponding to a portion of the face obscured by the mask when the mask is worn by the guest and eject the mask with the printing from the printer.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the dynamic personalization of a respiratory mask. In accordance with an embodiment of the invention, a guest may be identified by way of scanning identification information for the guest such as may be present in a wearable pendant or wristband, or in an identity card, or within a mobile telephone to name a few examples. Thereafter, an image of a face of the guest may be retrieved from a data store corresponding to the identification information and a portion of the image corresponding to a portion of the face of the guest likely to be obscured by wearing a mask extracted from the image. Then, a printer may be loaded with a mask and the portion of the image may be printed thereon and ejected from the printer for wearing by the guest, so that when the guest wears the mask, the entirety of the face of the guest may be apparent despite the wearing of the mask.

Figure 1:
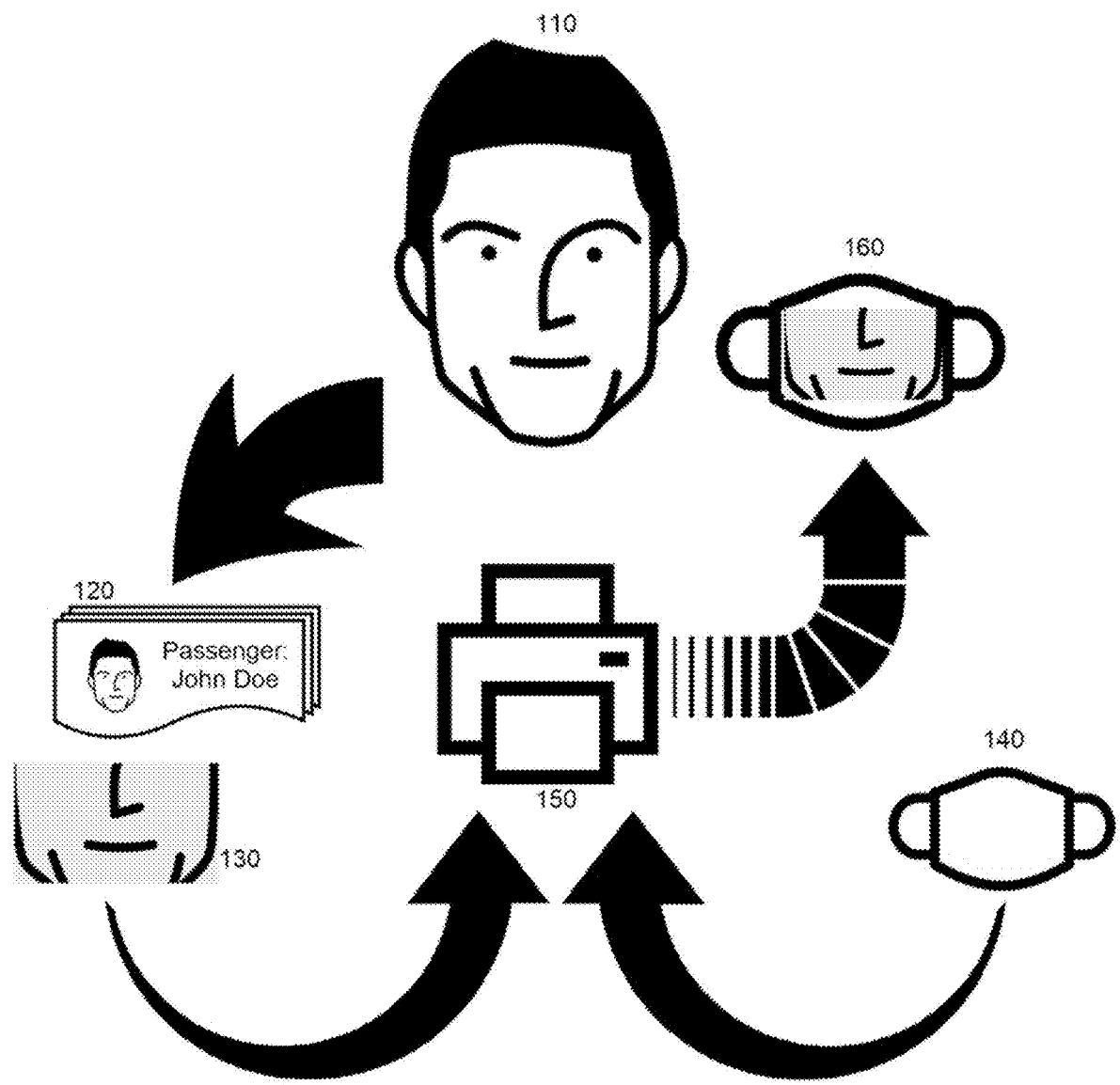
FIG. 1 is a pictorial illustration of a process for dynamic personalization of a respiratory mask.

In further illustration, FIG. 1 pictorially shows a process for dynamic personalization of a respiratory mask. As shown in FIG. 1, a guest 110 presents identification to a mask printing station 150 and an identity record 120 is then retrieved for the guest 110. The identity record 120 includes a digital image of the guest 110. Optionally, the identity record 120 includes dimensions computed for a face of the guest 110 such as a distance from ear to ear on the face of the guest, a distance from a bridge of the nose to the tip of the chin of the guest and a distance from cheek to cheek of the guest. From the digital image of the guest 110 in the record 120, a mask portion 130 of the face in the digital image of the guest 110 is determined as an area of the face likely to be obscured by the wearing of a blank mask 140 on the face of the guest 110.

Of note, the dimensions of the blank mask 140 may be stored in the mask printing station 150 and correlated to the dimensions of the face of the guest 110 so that the mask portion 130 of the image can be computed as the portion which is obscured when the blank mask 140 is affixed to the face of the guest 110. Thereafter, the mask portion 130 is printed onto a blank mask 140 at the mask printing station 150 so as to produce a printed mask 160 with the image of the mask portion 130 printed upon a face of the blank mask 140. Finally, the printed mask can be ejected from the mask printing station 150 and provided to the guest 110. In this way, even when wearing the printed mask 160, others are able to recognize a full image of the face of the guest 110 despite the guest 110 obscuring a portion of the face corresponding to the mask portion 130 by wearing the printed mask 160.

Figure 2:
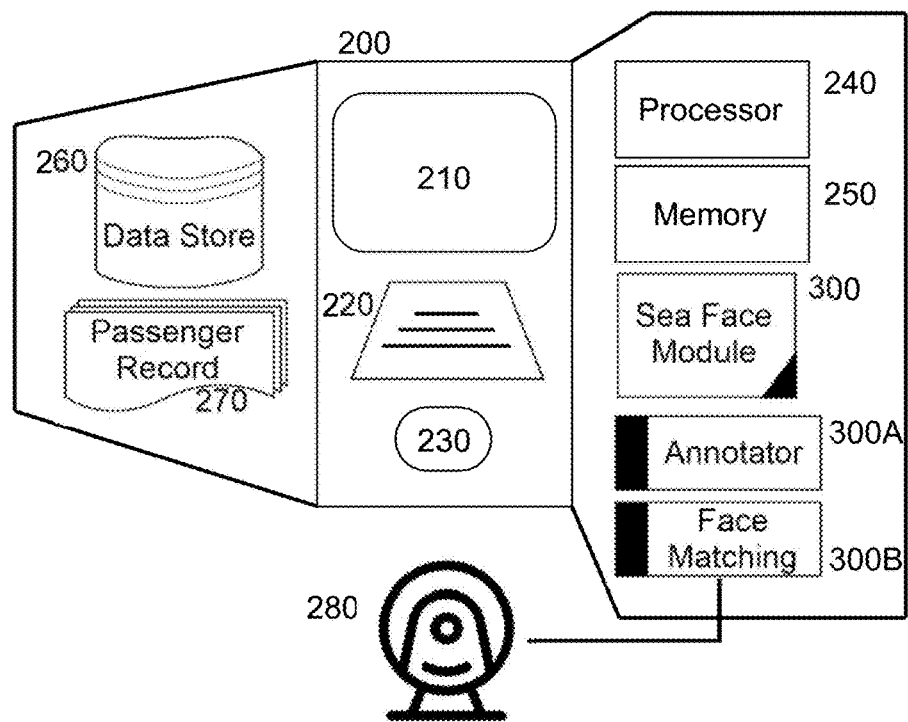
FIG. 2 is a schematic illustration of a data processing system adapted to dynamically personalize respiratory masks for different passengers of a cruise ship; and, FIG. 3 is a flow chart illustrating a process for the dynamic personalization of a respiratory mask.

The process broadly described in connection with FIG. 1 may be implemented within a data processing system incorporated into a mask printing station disposed at a check in or guest services desk of a vessel, or in the alternative, at a self-service kiosk. In further illustration, FIG. 2 schematically shows a data processing system adapted to dynamically personalize respiratory masks for different passengers of a cruise ship. As shown in FIG. 2, a mask printing station 200 is configured to include a display 210, a keyboard input device 220, a mask printer 230 adapted to print ink upon a respiratory mask such as an N95 or K95 mask, a processor 240, memory 250 and a data store 260 adapted to persist therein different passenger records 270 of different passengers aboard the vessel.

Notably, a sea face module 300 is included in the mask printing station 200. The sea face module 300 includes computer program instructions that execute in the memory 250 of the mask printing station 200. Upon execution, the program instructions identify a passenger on the vessel, either by scanning an identity card of the passenger, remotely sensing identifying information in a wearable such as a wrist band or pendant, or remotely sensing identifying information in a mobile phone, or receiving as input, identifying information from the passenger. Thereafter, the program instructions retrieve from the data store 260, a passenger record 270 corresponding to the passenger using the identifying information and optionally, an image of a face of the passenger from the passenger record 270 (though an image of the passenger can be contemporaneously acquired by a camera (not shown) affixed to the mask printing station 200, or by a camera of a mobile computing device of the passenger which is subsequently provided to the mask printing station 200 by way of wireless communications or Internet messaging.

Once the image of the passenger is placed into the memory 250, the program instructions extract from the image a portion corresponding to a lower face of the passenger expected to be obscured by the wearing of a mask. The program instructions may do so by correlating the known dimensions of the mask with the known dimensions of the face of the passenger and positioning a mask image of the mask in the same dimensions as the image of the face upon the image of the face at a position corresponding to how the mask is to be worn by the passenger. Then, the program instructions can define according to a common coordinate system of the mask image of the mask and the image of the face, a boundary of the area obscured by the mask image of the mask when the mask image of the mask is overlain upon the image of the face at the position corresponding to how the mask is to be worn by the passenger. The portion of the image of the face within the boundary is then extracted as a separate image by the program instructions.

Optionally, the portion of the image of the face within the boundary may be rendered in the display 210. As an additional option, the entirety of the image of the face may be rendered in the display 210 by the program instructions, with the boundary denoted upon the entirety of the image in the display 210. Then, an annotator 300A may be invoked as a subset of the program instructions of the sea face module 300, which subset presents a tool palette of drawing tools such as a pen, eraser, fill tool, etc. Using the input device 220, or touch screen input of the display 210, the passenger may then annotate the image of the face in the display 210 so as to create fanciful decorative elements, such as touch up paint or cartoonish icons. As well, pre-configured image filters may be applied to the image such as a filter accentuating the lips of the face or the cheeks of the face. The resultant image may then be persisted and the program instructions of the sea face module 300 may then print the extracted image, with or without annotations, upon a blank surface of a respirator mask using the printer 230.

As another option, a face matching subset 300B of the sea face module 300 includes program instructions adapted to composite the image of the passenger with the extracted image on the mask as an alternative image to the image of the passenger. In this way, when a camera 280 coupled to the face matching subset 300B captures an image of the passenger as the passenger approaches a portal of the vessel, image matching can be performed as between the captured image and both the image of the passenger and also the composite, alternative image so as to recognize the passenger irrespective of whether or not the passenger is wearing the mask. In this way, despite the wearing of the mask, the program instructions of the face matching subset 300B is able to recognize the passenger at the portal.

Figure 3:
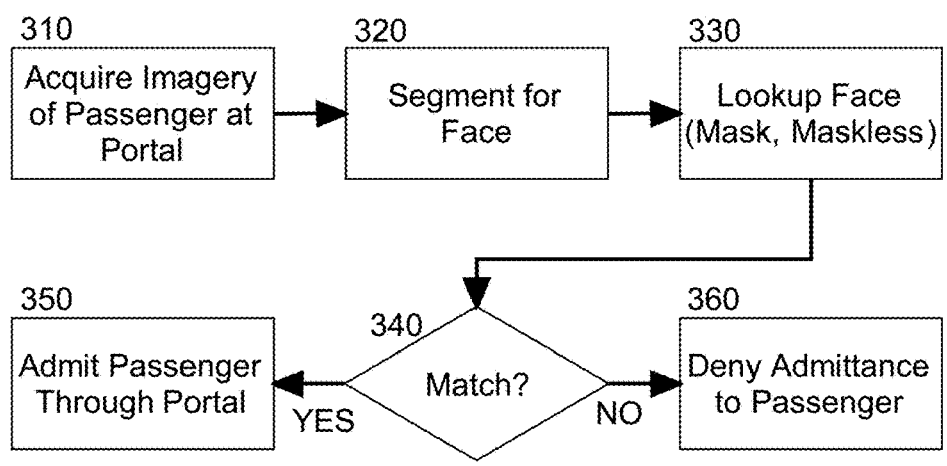

In even yet further illustration of the operation of the program instructions of the face matching subset 300B, FIG. 3 is a flow chart illustrating a process for the dynamic personalization of a respiratory mask. Beginning in block 310, imagery of passengers approaching the portal of the vessel may be acquired and in block 320, the captured imagery may be segmented to extract only the faces of passengers in the imagery. Then, in block 330, for each face, a lookup is performed against a database of facial images and secondarily, against a database of printed masks. In decision block 340, it is determined whether or not the lookup produces a match against either images of the database of facial images, or secondarily, against the database of printed masks. If so, in block 350 the passenger is admitted through the portal. But otherwise, in block 360 the passenger is denied access to the vessel through the portal.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include", "includes", and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for the dynamic personalization of a respiratory mask, the method comprising:
   electronically scanning an identification of a guest in a mask dispensing computing system;
   querying a data store of images of guest faces for an image of a face matching the identification of the guest;
   retrieving the matching image of the face into memory of the computing system;
   loading a printer in the dispensing computing system with a respiratory mask;
   printing onto the mask a portion of the matching image of the face corresponding to a portion of the face obscured by the mask when the mask is worn by the guest; and,
   ejecting the mask with the printing from the printer.

2. The method of claim 1, wherein the mask is a respiratory mask selected from the group consisting of an N95 mask and a KN95 mask.

3. The method of claim 1, wherein the guest is a passenger on an oceangoing vessel.

4. The method of claim 3, further comprising:
   acquiring an image of a face of the guest wearing the mask with the printing at a portal to the oceangoing vessel;
   equating the acquired image of the face with the matched image from the data store; and,
   generating a display at the portal clearing the guest to pass through the portal.

5. The method of claim 1, further comprising:
   displaying in a display at the computing system, the portion of the matching image of the face corresponding to the portion of the face obscured by the mask when the mask is worn by the guest;
   presenting a palette in the display of different drawing tools;
   selecting through the display at least one of the drawing tools;
   applying at least one decorative annotation to the portion of the matching image of the face in the display with the selected at least one of the drawing tools; and,
   performing the printing onto the mask with the annotated portion of the matching image of the face.

6. The method of claim 5 further comprising:
   registering the annotated portion of the matching image of the face in the data store of images as an acceptable alternative to the image of the face matching the identification of the guest;
   acquiring an image of a face of the guest wearing the mask with the printing at a portal to the oceangoing vessel;
   equating the acquired image of the face with the registered annotated portion of the matching image from the data store; and,
   generating a display at the portal clearing the guest to pass through the portal.

7. A data processing system adapted for dynamic personalization of a respiratory mask, the system comprising:
   a host computing platform comprising one or more computers, each comprising memory and at least one processor, a display and a coupled printer; and,
   a mask printing module comprising computer program instructions enabled while executing in the host computing platform to perform:
   electronically scanning an identification of a guest;
   querying a data store of images of guest faces for an image of a face matching the identification of the guest;
   retrieving the matching image of the face into the memory;
   loading the printer with a respiratory mask;
   printing onto the mask a portion of the matching image of the face corresponding to a portion of the face obscured by the mask when the mask is worn by the guest; and,
   ejecting the mask with the printing from the printer.

8. The system of claim 7, wherein the mask is a respiratory mask selected from the group consisting of an N95 mask and a KN95 mask.

9. The system of claim 7, wherein the guest is a passenger on an oceangoing vessel.

10. The system of claim 9, wherein the program instructions further perform:
    acquiring an image of a face of the guest wearing the mask with the printing at a portal to the oceangoing vessel;
    equating the acquired image of the face with the matched image from the data store; and,
    generating a display at the portal clearing the guest to pass through the portal.

11. The system of claim 7, wherein the program instructions further perform:
    displaying in the display the portion of the matching image of the face corresponding to the portion of the face obscured by the mask when the mask is worn by the guest;
    presenting a palette in the display of different drawing tools;
    selecting through the display at least one of the drawing tools;
    applying at least one decorative annotation to the portion of the matching image of the face in the display with the selected at least one of the drawing tools; and,
    performing the printing onto the mask with the annotated portion of the matching image of the face.

12. The system of claim 11, wherein the program instructions further perform:
    registering the annotated portion of the matching image of the face in the data store of images as an acceptable alternative to the image of the face matching the identification of the guest;
    acquiring an image of a face of the guest wearing the mask with the printing at a portal to the oceangoing vessel;
    equating the acquired image of the face with the registered annotated portion of the matching image from the data store; and,
    generating a display at the portal clearing the guest to pass through the portal.

13. A computer program product for dynamic personalization of a respiratory mask, the computer program product including a non-transitory computer readable storage medium having program instructions embodied therewith, the program instructions executable by a device to cause the device to perform a method including:
    electronically scanning an identification of a guest in a mask dispensing computing system;
    querying a data store of images of guest faces for an image of a face matching the identification of the guest;
    retrieving the matching image of the face into memory of the computing system;
    loading a printer in the dispensing computing system with a respiratory mask;
    printing onto the mask a portion of the matching image of the face corresponding to a portion of the face obscured by the mask when the mask is worn by the guest; and, ejecting the mask with the printing from the printer.

14. The computer program product of claim 13, wherein the mask is a respiratory mask selected from the group consisting of an N95 mask and a KN95 mask.

15. The computer program product of claim 13, wherein the guest is a passenger on an oceangoing vessel.

16. The computer program product of claim 15, wherein the method further includes:
   acquiring an image of a face of the guest wearing the mask with the printing at a portal to the oceangoing vessel;
   equating the acquired image of the face with the matched image from the data store; and,
   generating a display at the portal clearing the guest to pass through the portal.

17. The computer program product of claim 13, wherein the method further includes:
   displaying in a display at the computing system, the portion of the matching image of the face corresponding to the portion of the face obscured by the mask when the mask is worn by the guest;
   presenting a palette in the display of different drawing tools;
   selecting through the display at least one of the drawing tools;
   applying at least one decorative annotation to the portion of the matching image of the face in the display with the selected at least one of the drawing tools; and,
   performing the printing onto the mask with the annotated portion of the matching image of the face.

18. The computer program product of claim 17, wherein the method further includes:
   registering the annotated portion of the matching image of the face in the data store of images as an acceptable alternative to the image of the face matching the identification of the guest;
   acquiring an image of a face of the guest wearing the mask with the printing at a portal to the oceangoing vessel;
   equating the acquired image of the face with the registered annotated portion of the matching image from the data store; and,
   generating a display at the portal clearing the guest to pass through the portal.

* * * * *